Aug. 23, 1932.  P. HITT  1,872,951
PRINTING TELEGRAPH SYSTEM
Filed May 6, 1930  8 Sheets-Sheet 2
FIG.2
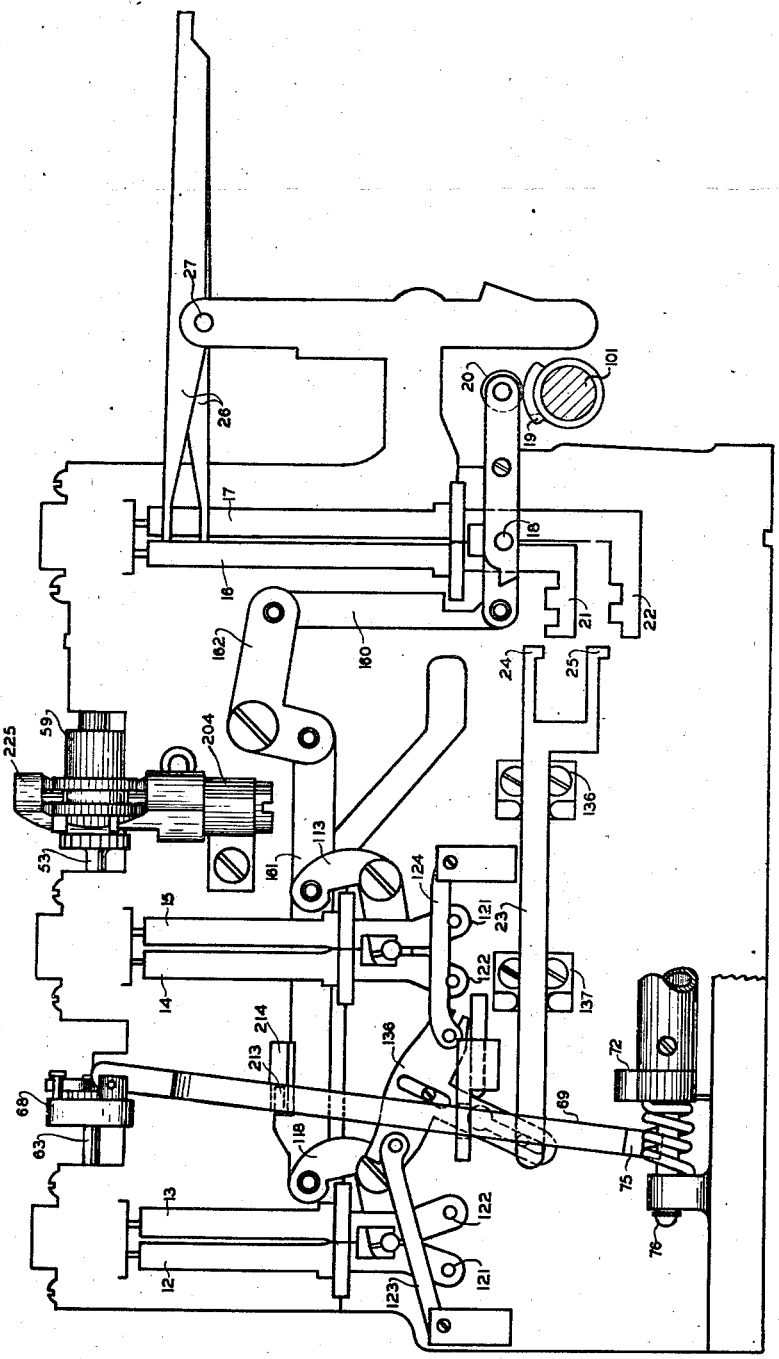
INVENTOR
PARKER HITT
BY
ATTORNEY

INVENTOR
PARKER HITT

ATTORNEY

Aug. 23, 1932.   P. HITT   1,872,951
PRINTING TELEGRAPH SYSTEM
Filed May 6, 1930   8 Sheets-Sheet 5

INVENTOR
PARKER HITT
BY
ATTORNEY

Aug. 23, 1932.  P. HITT  1,872,951
PRINTING TELEGRAPH SYSTEM
Filed May 6, 1930  8 Sheets-Sheet 6
FIG.6
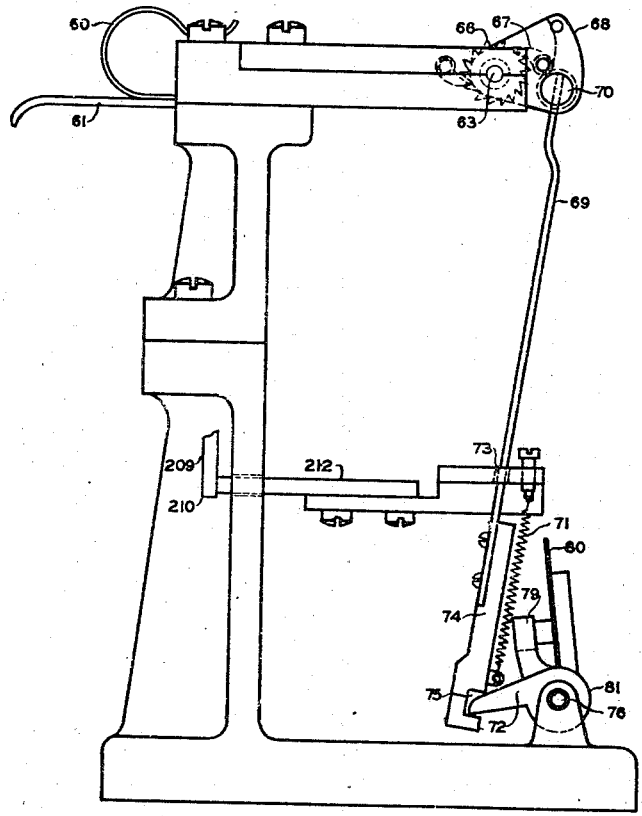
INVENTOR
PARKER HITT
BY
ATTORNEY Aug. 23, 1932.  P. HITT  1,872,951
PRINTING TELEGRAPH SYSTEM
Filed May 6, 1930  8 Sheets-Sheet 7

INVENTOR
PARKER HITT
BY
ATTORNEY

Aug. 23, 1932.  P. HITT  1,872,951
PRINTING TELEGRAPH SYSTEM
Filed May 6, 1930   8 Sheets-Sheet 8
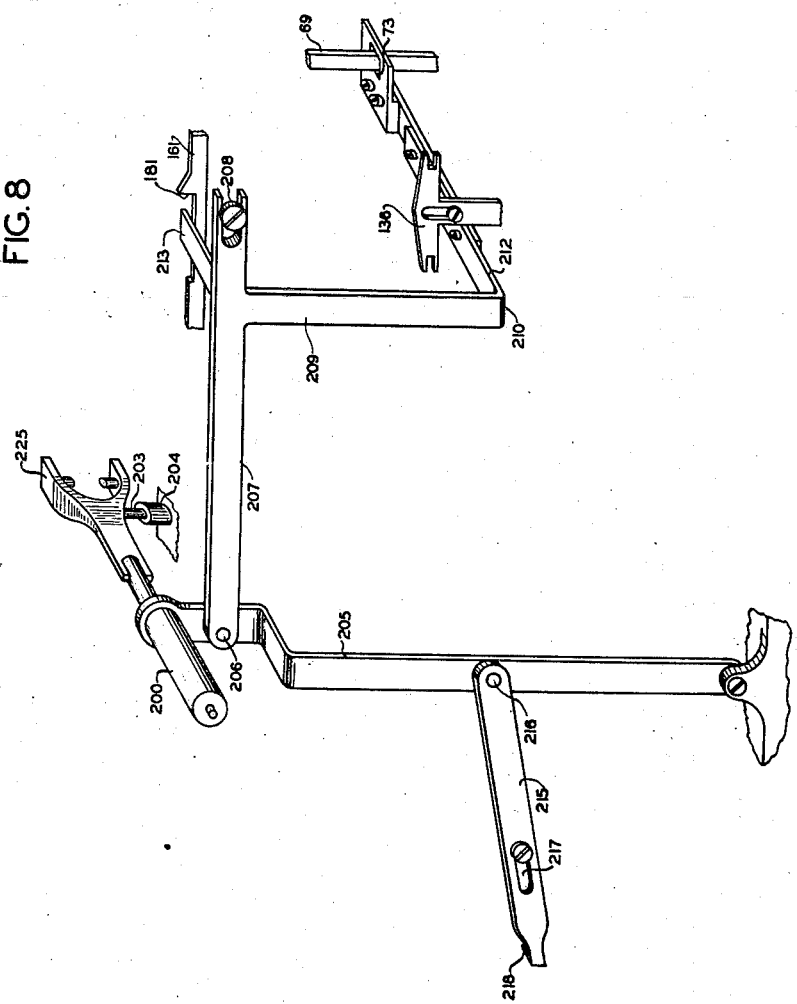
INVENTOR
PARKER HITT
BY
ATTORNEY Patented Aug. 23, 1932

1,872,951

UNITED STATES PATENT OFFICE

PARKER HITT, OF NEW YORK, N. Y., ASSIGNOR TO INTERNATIONAL COMMUNICATIONS LABORATORIES, INCORPORATED, OF NEW YORK, N. Y.

PRINTING TELEGRAPH SYSTEM

Application filed May 6, 1930. Serial No. 450,194.

This invention relates to telegraph systems and more particularly to systems in which intelligence is transmitted enciphered and automatically deciphered when received.

The present invention has for its object to provide a simplified apparatus by which messages transmitted in cipher may be automatically deciphered with a minimum of expense and delay. This apparatus is adapted to be used in connection with a cipher system in which the message in plain language is enciphered at the distant end of the circuit by means of a key tape which may be used to control the perforating mechanism in order to prepare an enciphered transmitting tape. The signals might also be enciphered by altering normal code impulses while transmitted by means of the key tape. Such enciphered signals may be used to control the receiving perforator at the distant end of the line which will record a duplicate of the transmitted impulses in the form of a perforated tape. In order to decipher this tape, it is necessary to have a key tape which is a duplicate of the one used in preparing the cipher at the transmitting station.

By means of this invention a printed translation of the enciphered signals may be produced at the receiving station by operating the machine under the joint control of the received tape and the key tape. It is essential that the key tape at the receiving station be identical with that used in preparing a cipher and must bear the same relative position to the received tape as the one at the distant end while the message was being enciphered.

In this cipher system, each element or unit of the original text is enciphered by a corresponding unit or element of a key and each element or unit of the received cipher tape is deciphered by a corresponding unit or element of an identical key. The following table shows all the possible combinations in the system to be used:

| Original element | Key tape | Cipher tape | Key tape | Received element |
|---|---|---|---|---|
| + | + | + | + | + |
| + | - | Space | - | + |
| - | Space | - | Space | - |
| - | + | Space | + | - |
| - | Space | + | Space | - |
| Space | + | - | + | Space |
| Space | - | + | - | Space |
| Space | Space | Space | Space | Space |

The printing mechanism employed in connection with this invention is similar to that described in Patent No. 1,529,873 of March 17, 1925 to F. G. Creed. This printer has a selecting system which is controlled by perforated tape which is fed through a tape guide by a suitable feed mechanism. Under the tape guide are a number of selector plates which are arranged to be reciprocated in a vertical plane by suitable cam action, the extent of their travel being determined by the presence or absence of perforations in the tape. Permutated discs set in accordance with the position of the selector plates co-operate with a number of stop bars to determine which letter shall be printed.

In the present invention, mechanism similar to that described is used, except that printer selector plates may be controlled by additional mechanism operated jointly by key tape and cipher tape in order to print a deciphered copy of the enciphered message. By means of a cipher lock-out system the key and the cipher tape mechanism may be disconnected from the normal printer mechanism so that the printer can print plain text tape in the usual way.

Referring to drawings:

Fig. 2 shows the outline of the rear of the ciphering mechanism with the cipher mechanism locked out and also part of the printer.

Fig. 6 is an end view of the printer showing the ratchet mechanism for feeding key tape.

Fig. 8 is a perspective view showing the cipher lock-out mechanism.

Figure 3:
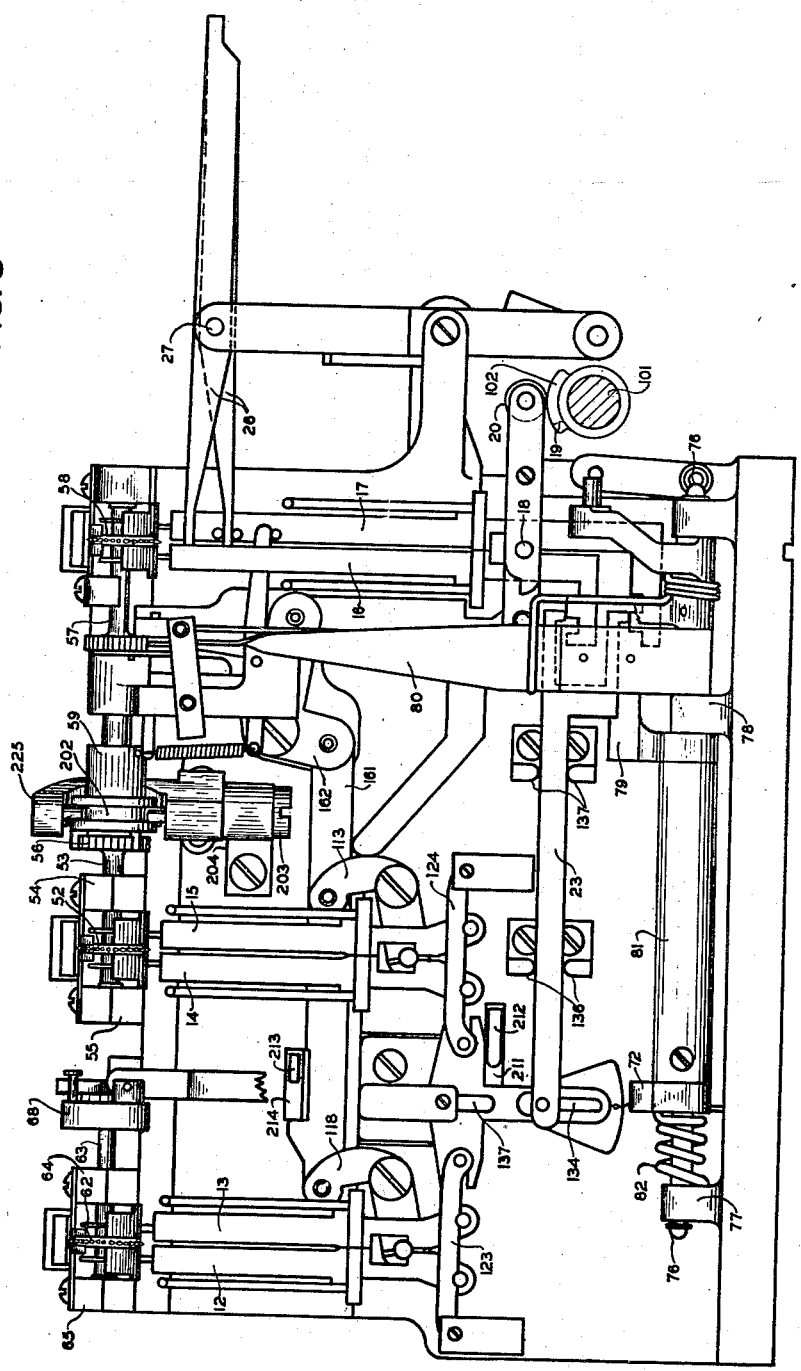
Fig. 3 is a rear view of the ciphering mechanism in position to operate the printer and also part of the printer mechanism.
Figure 4:
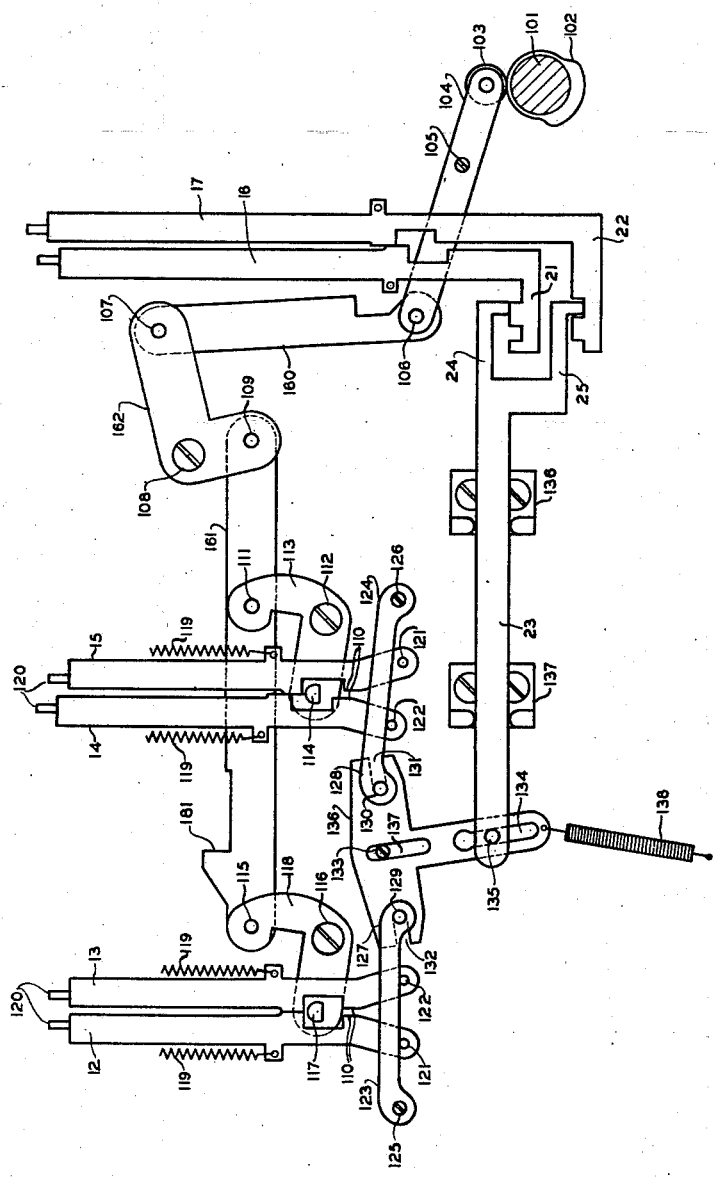
Figs. 4 and 5 are views showing the cipher mechanism and the selector plate reciprocating system diagrammatically.
Figure 5:
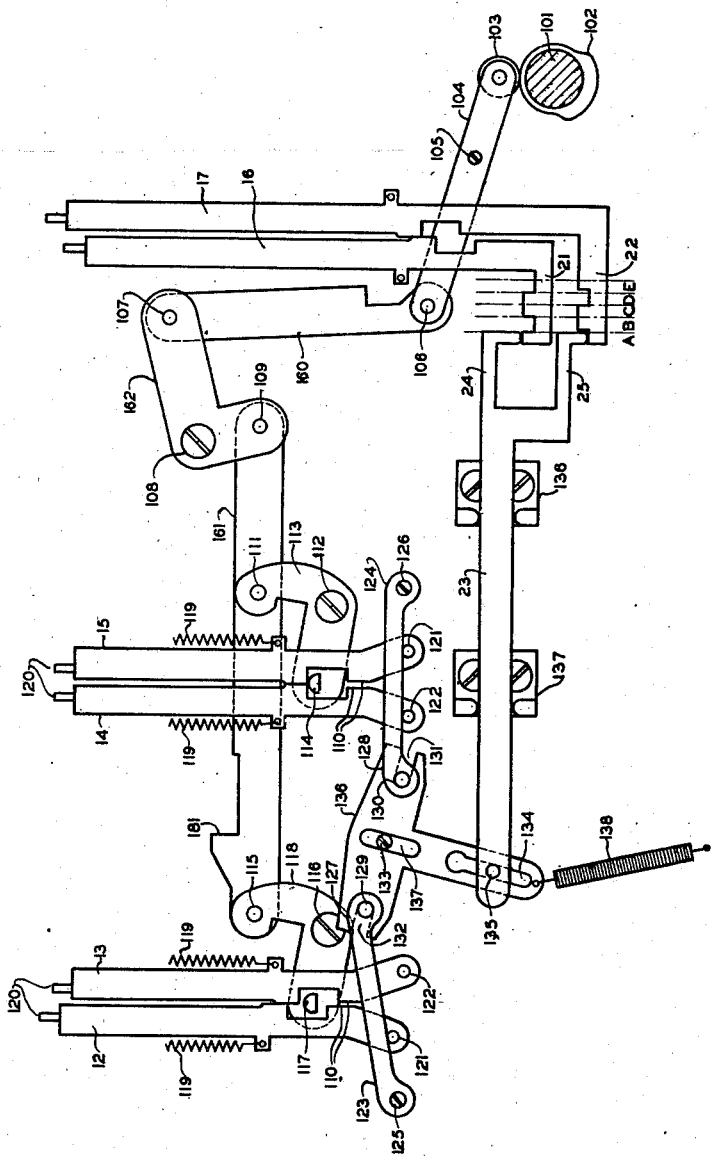

In Figs. 3, 4 and 5 of the drawings the selector plates 16 and 17 for the printer mechanism are shown. They are reciprocated (Fig. 7) by the rotation of the cam 19 on shaft 101, roller 20 and pin 18. Reset levers 26 (Fig. 3) are rotated on pivot 27, their position depending on the settings of selector plates 16 and 17 which in turn set a series of permutated discs accordingly as set forth in the patent to Creed hereinbefore mentioned.

Figure 1:
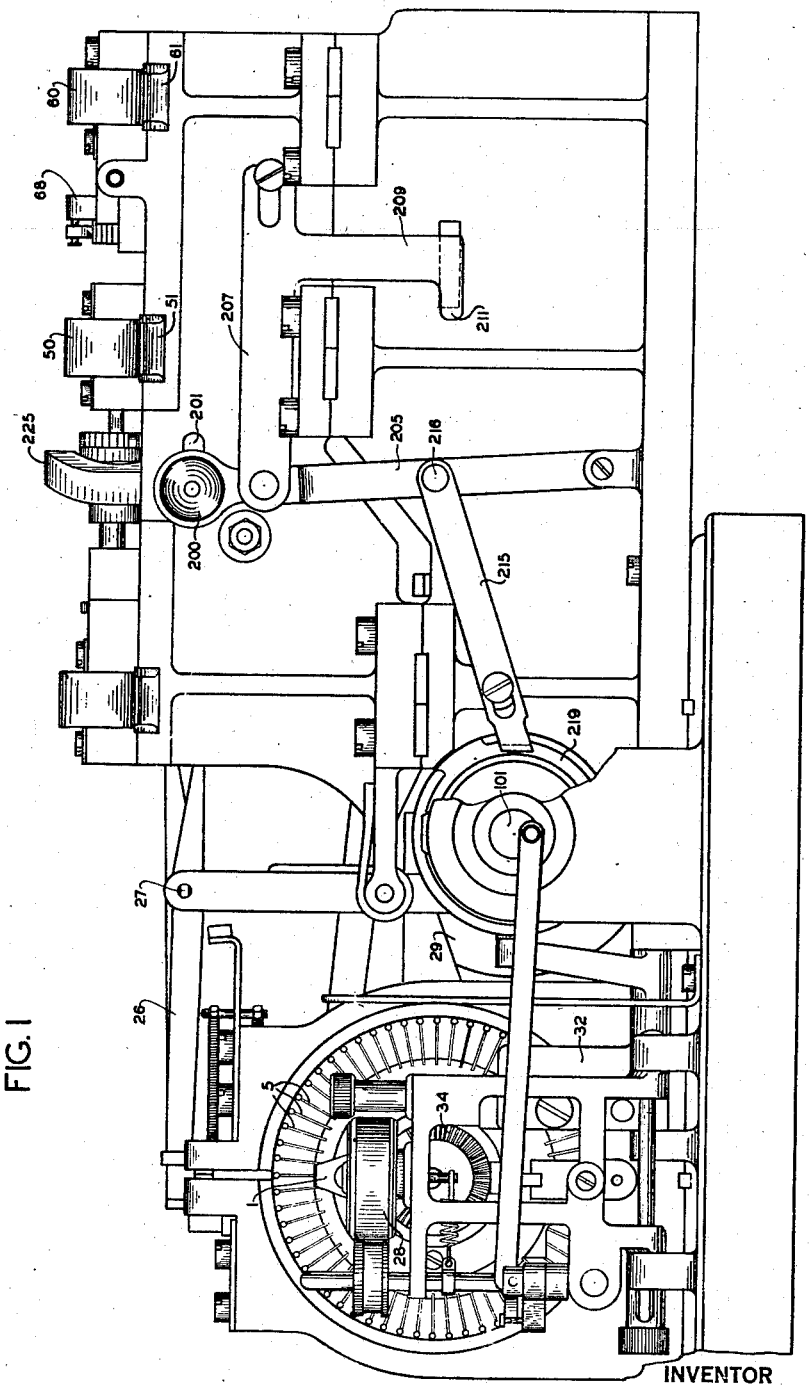
Figure 1 is a front elevation of the printer showing the tape guides for the printing mechanism and also those for the cipher tape and key tape, part of the cipher cut-out mechanism being also shown.
Figure 7:
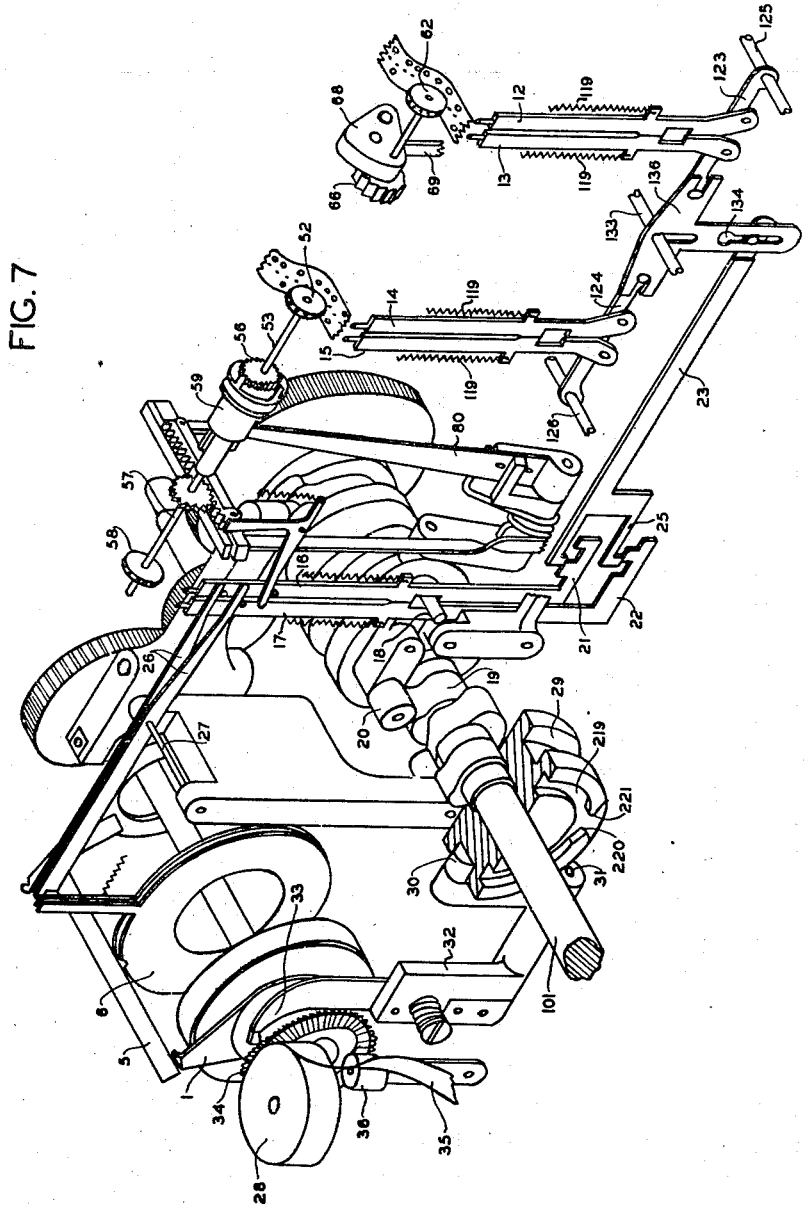
Fig. 7 is a diagrammatic perspective view of the apparatus.

In Figs. 1 and 7 selecting levers 5 are shown disposed around permutated discs 6 which are so notched about their outer edges that for each selection a series of notches will be aligned, permitting a lever 5 to drop into path of radial arm 1 which will stop the type wheel 34 at a certain point in relation to platen 28. Immediately thereafter, cam 29, of which only a section is shown in Fig. 7, will move roller 30 carried by print hammer, supporting member 32, rotating it on its pivot 31 which will cause print hammer 33 to engage the type wheel 34 and print the selected letter on tape 35 which is held against the platen 28. A roller 36 presses against the type wheel 34 as it rotates in order to keep the characters properly inked.

It is believed that the above very brief description of the printer mechanism is sufficient, because that part of the apparatus utilized in the execution of the present invention is the same as that described by the patent above referred to.

According to the present invention, the feeding mechanism for the cipher tape comprises a pair of perforated plates 50 and 51, Fig. 1, arranged above selector plates 14 and 15, Figs. 3, 4 and 7, so that the selector pins 120 may pass through the perforations therein (not shown). The plates are separated a short distance from each other to form a guide way for the perforated tape. A tape feed wheel 52, Figs. 3 and 7, extends through the upper plate into the guide way and is carried by a spindle 53 mounted in stationary bearings 54 and 55. The spindle is driven by a toothed clutch 56, Figs. 3 and 7, which has a driving member 59 driven from the spindle 57 of the feed wheel 58 associated with the selector plates 16 and 17.

The guide for the key tape is similar to that just described. It comprises a pair of perforated plates 60 and 61, Fig. 1, having a feed wheel 62, Fig. 3, extending through the upper plate into the guide way and carried by a spindle 63 mounted on stationary bearings 64 and 65. Mounted on one end of the spindle 63 is a ratchet 66 (Fig. 6) engaged by a pawl 67 carried by a supporting member 68, which latter is pivoted on the spindle 63. There are the same number of teeth on the ratchet 66 as there are points on feed wheel 62. The pawl steps the ratchet forward one tooth at a time as the supporting member 68 is oscillated on its pivot by means of a blade 69 pivoted to the support member at 70. At the lower end of the blade is a member 74 having a notch 75 which is engaged by cam 72 attached to one end of a sleeve 81 mounted on a bearing rod 76 (Fig. 3) held by fixed supports 77 and 78. At the other end of the sleeve is a crank 79 which is engaged by the lower end of the printer tape feed arm 80 each time the printer feed mechanism operates.

The motion of the arm 80 at the point where it comes in contact with 79 is uniform and it effects a uniform partial rotation of sleeve 81 and the cam 72 carried thereby. The movement of cam 72 withdraws blade 69 a sufficient distance for pawl 67 to drop into a new tooth on the ratchet wheel 66 and as the motion of the cam reverses, feed wheel 62 will be rotated the distance of one centre hole under the influence of retractile spring 71. Feed wheel 62 only feeds one centre hole at a time, regardless of the extent that the cipher tape is fed. Spring 82 restores sleeve 81 each time it is rotated by printer tape feed arm 80.

In addition to cam 19 referred to above, the main cam shaft 101 (Figs. 3, 4 and 5) carries a cam 102 which is arranged to operate a system of levers and bell cranks by means of which key tape selector plates 12, 13 and the cipher selector plates 14 and 15 are reciprocated in a vertical direction. All selector plates are withdrawn from the tape simultaneously, but cam 102 cuts off just before cam 19 in order to release the selector plates for the key and cipher tapes and have them positioned before the printer selector plates 16 and 17 are released. To this end a cam follower 103 operates lever 104 which is pivoted at 105 and is pivotally connected to bell crank 162 at 107 by means of link 160. Bell crank 162 is rotatably mounted on a suitable bearing 108. A link 161 is pivoted to 162 at 109. A bell crank 113 is mounted on a bearing 112 and is attached to link 161 by pivot 111. The other end of 113 carries a rod 114 which projects at right angles to the bell crank through a slot which is common to all the selector plates 14 and 15 in the cipher tape assembly. A second bell crank arrangement similar to the one just described, is provided for the selector plates 12 and 13 for the key tape. Bell crank 118 is pivoted to 161 at 115 and is mounted on a suitable bearing 116 so that it is free to rotate. Bell crank 118 carries a rod 117 which is similar to 114 and functions in the same manner.

As shaft 101 rotates, the high portion of cam 102 will be brought under cam follower 103 which will bring down link 160. The rotation of bell crank 162 on its bearing 108 will force link 161 to the left. This motion will cause bell cranks 113 and 118 to rotate, forcing rods 114 and 117 down against the steps 110 in the selector plates, withdrawing them against the tension of the springs 119. When 103 moves to the low section of cam 102, rods 114 and 117 are lifted from the steps 110 and the selector plates are moved upward by the springs 119. While under control of the springs 119, each selector plate will occupy one of two positions which is determined by the perforations in tape. Either the selecting pin 120 carried by each selector plate will pass through a perforation and permit the selector plate to rise the maximum distance, or else the pin will be stopped by being brought against the tape when there is no perforation. From the foregoing it will be seen that each time shaft 101 rotates, all selector plates are withdrawn from the tape, then released, and on release positioned by the springs according to the perforations in the tape in their respective guide plates.

The selector plates for the key tape and the cipher tape jointly control a novel mechanism by which the effect of the enciphered perforations of the cipher tape and that of the key tape are combined as a means to control the setting of the selector plates 16 and 17 of the printing mechanism in order to reproduce a printed copy of the message as it was before it was enciphered.

The mechanism about to be described is adapted to be used in connection with the so-called continental cable code but it will be obvious to those well versed in the art that it may be arranged to be used with various other codes without departing from the spirit and scope of this invention. Six pairs of selector plates are used in connection with the key tape and six with the cipher tape, this number being sufficient for the characters in the continental code.

Each selector plate in the key and cipher groups carries a small stud 121 or 122 (Figs. 2, 3 and 4). These studs, in the key group, engage six links 123 assembled and pivoted on a rod 125 secured to the frame of the machine.

The studs 121 and 122 of each pair of selector plates in the key tape group are arranged to engage the links 123 in such a way that the free end 127 of the links 123 will be variably positioned, depending on the setting of said selector plates. The studs 121 and 122 carried by the cipher selector plates engage a group of six links 124 in a similar manner. These links are pivoted on a common rod 126 carried by the frame of the printer in such a way that their free ends 128 are opposite the free ends 127 of links 123. Midway between the link ends 127 and 128 is located a spindle 133 which is also affixed to the frame of the printer.

Six slotted T-shaped members 136 are carried by the spindle 133 and are freely movable thereon within the limits of their slots 137. Two horizontal slots 131 and 132 at the ends of the arms of each of the T-members embrace studs 129 in links 123 and 130 in links 124 respectively. These studs are freely movable in said slots. Each T-member has another vertical slot 134 in the lower portion and these slots each engage a stud 135 of a horizontal selector bar 23. There are six of these bars 23, which are movable longitudinally through guides 136 and 137, their motion and its extent depending on the setting of the particular T-member with which each bar engages. A light spring 138 is attached to the lower end of each T-member tending to restore it to a vertical position, but the tension of the springs 119 attached to the selector plates will prevail in positioning the T-member when any selector pin 120 passes through a hole in its tape.

The lower ends of printer selector plates 16 and 17 are provided with notched L-shaped extensions 21 and 22. The juxtaposed ends of the selector bars 23 are Y-shaped and the arms 24 and 25 thereof are arranged to take any one of five positions over the extensions 21 and 22, which position will be determined by the particular T-member associated with that selector bar. The arrangement of notches and elevations on extensions 21 and 22 is shown in Fig. 5 and are referred to in order from left to right as A, B, C, D and E respectively. It is obvious that if the ends 24 and 25 are positioned above a notch in their respective selector plates 16 and 17, said plates will be permitted to rise when released by cam 19, but if the ends 21 and 22 are above an elevation on the L-shaped extensions, the upward movement of the plates 16 and 17 will be prevented and the operation of the printing mechanism governed accordingly.

When the key tape and cipher tape are in their respective feed ways, each co-operating group of four selector plates 12, 13, 14 and 15 have nine possible relative positions and the purpose of this mechanism is to translate these nine possible positions into the three possible positions of the normal selector plates 16 and 17 according to the cipher system discussed above.

There are three cases (all down, 13 and 14 up, 12 and 15 up) where the relative positions of the key and cipher selector plates will result in a vertical position for the lower arm of the T-member and in each of these cases the ends 24 and 25 of horizontal selector bar 23 will rest at position C of extensions 21 and 22. In these three cases, selector plates 16 and 17 will not be able to come up and the mechanism will act as if there were a space in the feed way. When 14 is up, or when 13 and 15 are up together, the T-member will be tipped slightly to the right as shown in Fig. 4 and the ends 24 and 25 of the horizontal selector bar will rest at position D so that selector plate 16 is held down and plate 17 is forced to come up.

When 13 alone is up, or when 12 and 14 are up together, the T-member will be tipped slightly to the left, making the selector bar 23 rest at B and releasing plate 16 while holding 17.

When 12 alone is up, the T-member will be tipped well to the left so that the selector bar rests on point A, holding plate 16 and permitting 17 to rise.

When 15 alone is up, the T-member will be tipped well to the right so that the selector bar 23 rests on point E, holding plate 17 and permitting 16 to rise.

By means of certain lock-out mechanism about to be described, the ciphering apparatus may be disconnected and the printer used for plain language traffic.

Referring to Figs. 1 and 8, a handle 200 extends through a slot 201 in the printer frame where it engages a clutch throw-out member 225 which is in engagement with a groove 202 in the driving member 59 of the cipher tape feed clutch (Fig. 3). The throw-out member is pivoted on a bearing screw 203 which is carried by a supporting block 204. The handle 200 also controls an upright lever 205 which has pivoted to it at 206 a horizontal bar 207.

To disengage the cipher mechanism, the handle 200 is moved to the extreme right of slot 201 which moves the horizontal bar 207 to the right, together with several extension members carried thereby, which members comprise a latch 213 projecting through a slot 214 (Fig. 3) in the frame of the printer which locks the selector plates 12, 13, 14 and 15 (Fig. 3) in down position by engaging a step 181 on bar 161, a member 209 which extends downward, then bends at 210 and projects horizontally at 212 through a slot 211 (Fig. 3) in the frame of the printer. The member at 212 engages the T-members, forcing them to withdraw the selector bars 23 from engagement with the printer selector plates 16 and 17 and disconnects the key tape feed mechanism by forcing the side of slot 73 against blade 69 which moves notch 75 clear of cam 72 (see Fig. 6).

In order that the cipher mechanism may be placed in operation or disengaged from the printer at the proper point in the operating cycle, there is provided a bar 215 pivoted to 205 at 216, the end of which is bent as shown at 218. The turned portion 218 is adapted to engage the inner surface of a groove 219 in cam 29 (see Figs. 1 and 7) when the cipher mechanism is in operation. The groove 219 prevents handle 200 from being moved to the right to throw out the cipher mechanism until an opening 220—221 (Fig. 7) in the wall of the groove comes opposite 218. The edge 221 acts as a cam to force 218 clear of the opening to disconnect the cipher mechanism when the handle is held towards the right. Likewise, the cipher mechanism cannot be placed in operation again until the opening 220—221 comes opposite 218 and then if 200 be pressed to the left, the edge 220 will cam end 218 back into the groove 219.

From the above it will be seen that when the cut-out mechanism is moved to the cut-out position it performs the following functions:

1. It holds the T-members over to the left so that the horizontal selector bars 23 are entirely clear of the L-shaped ends of the printer selector plates 16 and 17.

2. It holds the selector plates 12, 13, 14 and 15 in the full down position.

3. It operates the clutch 56—59 to disconnect the printer feed shaft 57 from the cipher feed shaft.

4. It disconnects the key tape feed mechanism.

5. When the machine is to handle cipher tape these four functions are performed simultaneously, and at the proper point in the operating cycle by releasing the lock-out lever which is then drawn over by a cam on the main shaft and locked in its new position.

This invention operates as follows:

Let − represent a dash in the continental cable code, + a dot and × a space. The elements which make up the word "the" then will be − × + + + + × + which, if ciphered by any key tape having an indiscriminate series of dotes, dashes and spaces so that the key tape as it is stepped forward presents a combination of elements such as + + − + − × − − which coincide in order with the eight original elements as selected, then according to the table hereinbefore given, the resulting cipher as set and received will be × − × + × − + ×.

Now assume that the cipher tape is being fed through the deciphering mechanism at the receiving station, while at the same time a key tape identical with that used in preparing the cipher and similarly positioned in relation to the cipher tape, is being fed through the key tape guide.

By referring to the table given below the action of the mechanism which combines the elements of the key tape and cipher tape may be traced to the point where it controls the selector plates of the printer.

| Original | Key | Cipher | Setting of sel. plates, sel. bars according to key and cipher | | |
|---|---|---|---|---|---|
| | | | Sel. plates selected | Position of sel. bars on notches in ends of 16 and 17 | Ptr. sel. plates up |
| T { −, ×, +, + } | +, −, +, × | ×, ×, +, − | 12, 12 and 15, 15, 12 and 14 | A, C, E, B | 17−, ××, 16+, 16+ |
| H { +, +, ×, + } | | | 15, 13, 12 and 15, 15 | E, B, C, E | 16+, 16+, ××, 16+ |
| E { ×, + } | −, − | +, × | | | |

The invention here shown and described is susceptible of other modifications which may be made without departing from the spirit thereof.

What is claimed is:

1. A deciphering device comprising a selecting mechanism and a printing mechanism controlled thereby, means comprising a plurality of perforated tapes for operating said selecting mechanism, and means for feeding one of said tapes at a constant speed and the other at a variable speed.

2. A deciphering device comprising a selecting mechanism and a printing mechanism controlled thereby, means comprising a plurality of perforated tapes for operating said selecting mechanism, means for feeding one of said tapes at a regular rate and means for operating said other feeding mechanism variably, the variation being governed by the selecting mechanism.

3. A deciphering device comprising a plurality of T-shaped members, mechanism controlled by a key tape and a cipher tape for variably tilting said members, and selector bars associated with and operated by said T-shaped members.

4. In telegraph apparatus, the combination of a member substantially T-shaped, a plurality of selecting means for variably setting said member and a selector bar positioned according to the setting of said T-shaped member.

5. A deciphering machine comprising, printing mechanism, selecting mechanism, means for feeding unciphered tape, ciphered tape and key tape through said apparatus respectively, manual means for bringing said unciphered tape into operation, or for bringing said cipher and key tapes into operation, and all mechanical means for operating said selecting mechanism from said tapes.

6. A deciphering machine comprising, printing mechanism, selecting mechanism therefor including selector plates, cipher and key tape feeding means, selector plates cooperating with said tapes, means for converting the vertical movement of said cipher and key plates into a horizontal motion, and means for causing said horizontal motion to control the vertical movement of the printer selector bars to in turn control the selector mechanism.

7. A deciphering machine comprising, printing mechanism, selecting mechanism therefor including selector plates, cipher and key tape feeding means, selector plates cooperating with said tapes, selector bars controlling the movement of said printer selector plates, and motion converting means connecting the cipher and key tape selector plates and the selector bars respectively.

8. A deciphering machine comprising, printing mechanism, selecting mechanism therefor including selector plates, cipher and key tape feeding means, selector plates cooperating with said tapes, selector bars controlling the movement of said printer selector plates, means under the control of the conjoint action of said cipher and key tape selector plates for controlling the movement of said selector bars, and means for withdrawing all of the selector plates simultaneously and releasing the cipher and key tape selector plates in advance of said printer selector plates.

9. A deciphering machine comprising, printing mechanism, selecting mechanism therefor including selector plates, cipher and key tape feeding means, selector plates cooperating with said tapes, selector bars controlling the movement of said printer selector plates, and means under the control of the conjoint action of said cipher and key tape selector plates for controlling the movement of said selector bars.

10. A recording device comprising, a plurality of permutated selecting mechanisms, one of said mechanisms being arranged to invariably control the recording mechanism, means to control the other of said permutated means, and means for operating said controlling means.

11. A recording device comprising, a plurality of permutated selecting mechanisms, one of said mechanisms being arranged to invariably control the recording mechanism, controlling means for said second-mentioned permutation means, and key and cipher tape mechanisms for imparting movement to said last-mentioned controlling means.

12. A deciphering device comprising, printing means, selecting means including selector plates for controlling the printing means, cipher and key tape feeding mechanisms, the selector plates being under the joint mechanical control of the cipher and key tapes.

13. A deciphering device comprising, a printing mechanism, a selecting mechanism therefor, and selector bars arranged to be variably positioned by a key tape and a cipher tape and controlling said selection mechanism, said positioning taking place invariably in advance of the printing cycle.

14. In a telegraph printer, the combination of selector mechanism, means for controlling said selector mechanism, additional means for controlling said first-mentioned means when enciphered messages are to be printed in deciphered form, said first-mentioned means alone being operative to control said selector mechanism when non-ciphered messages are to be printed.

15. A deciphering device comprising a selecting mechanism and a printing mechanism controlled thereby, means comprising a plurality of perforated tapes for operating said selecting mechanism, and means for feeding said tapes at different relative speeds.

In witness whereof, I hereunto subscribe my name this 2nd day of May 1930.

PARKER HITT.